W. W. SIMRELL.
AUGER HANDLE.
No. 36,240.   Patented Aug. 19, 1862.
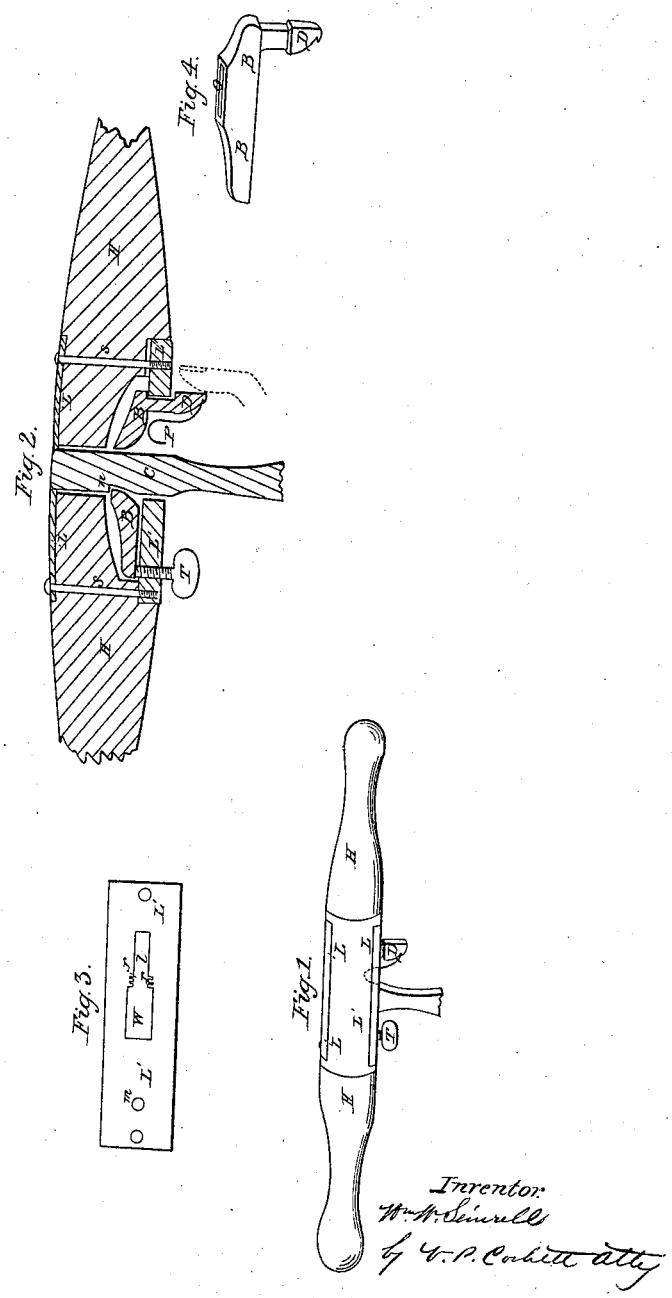

UNITED STATES PATENT OFFICE.

WILLIAM W. SIMRELL, OF GREAT BEND, PENNSYLVANIA.

IMPROVEMENT IN AUGER-HANDLES.

Specification forming part of Letters Patent No. 36,240, dated August 19, 1862.

*To all whom it may concern:*

Be it known that I, WILLIAM W. SIMRELL, of Great Bend, in the county of Susquehanna and State of Pennsylvania, have invented certain new and useful Improvements in Auger-Handles; and I do hereby declare that the following is a full, clear, and exact description of the construction and operation of the same, reference being had to the annexed drawings, making a part of this specification, in which—

Figure 1 is a perspective view of the handle. Fig. 2 is a horizontal section; Fig. 3, a view of the lower plate, and Fig. 4 the nut or collar.

In Fig. 1, L L and L' L' are two plates, of brass or other metal. The lower one, L' L', is more plainly shown at Fig. 3, where $l$ is a slot for the brace D, with creases $r\ r$ for the upper end of the spring P. W is the opening for the shank C, and $m$ the hole for the thumb-screw T. In the handle H H a cavity is made, into which the nut or collar B B is inserted. The collar or nut B B is more plainly represented in Fig. 4, which also shows the brace D and opening O.

In Fig. 2, S S are screws passing through the upper plate, L L, and handle H, and screwing into the lower plate, L' L', holding the plates firmly to the handle. In this figure is shown the position of the collar B B, brace D, spring P, thumb-screw T, and shank C, with its notch $n$. The shank C passes through the opening W in the lower plate, L', the upper end fitting into the opening in the upper plate, L, and the notch $n$ resting on the collar B. When the shank of the auger is passed through the opening in the handle, the spring P forces it to one side, so that the notch $n$ rests upon the collar B. The thumb-screw T is then turned until it forces the collar against the notch $n$, thus binding the shank firmly in the handle. To remove the auger, loosen the thumb-screw T and press the thumb against the brace D, when it can be easily removed. By this arrangement any common auger can, by flattening the end of the shank and filing a small notch in it, be made to fit the handle, and one handle will answer for a variety of sizes.

The advantages of this handle are its simplicity, cheapness, durability, and adaptedness to any ordinary handle and a variety of sizes, besides the impossibility of the auger ever getting loose in it to any extent, as by turning the thumb-screw T the shank is held firmly to its place.

What I claim as my invention, and desire to secure by Letters Patent, is—

The arrangement and combination of the collar or nut B, brace D, spring P, thumb-screw T, shank C, plates L L', and handle H, as and for the purposes set forth.

WM. W. SIMRELL.

Witnesses:
JOHN COLSTEN, Jr.,
WM. A. SNOW.